United States Patent [19]
Ohyama

[11] Patent Number: 5,874,901
[45] Date of Patent: Feb. 23, 1999

[54] ELECTRONIC EQUIPMENT

[75] Inventor: Takeshi Ohyama, Tokyo, Japan

[73] Assignee: Oki Electric Industry Co., Ltd., Tokyo, Japan

[21] Appl. No.: 716,769

[22] Filed: Sep. 24, 1996

[30] Foreign Application Priority Data

Oct. 2, 1995 [JP] Japan .................................. 7-255346

[51] Int. Cl.$^6$ .................................................. G08B 5/00
[52] U.S. Cl. .............................. 340/815.42; 340/815.43; 340/815.45; 340/815.68; 340/635; 340/691; 250/227.11; 362/26; 362/32
[58] Field of Search ................. 340/815.4, 815.41, 340/815.42, 815.43, 815.48, 815.5, 815.68, 332, 635, 691, 815.45; 250/227.11, 239; 362/26, 32

[56] References Cited

U.S. PATENT DOCUMENTS

| | | | |
|---|---|---|---|
| 5,268,823 | 12/1993 | Yergenson | 340/815.42 |
| 5,349,504 | 9/1994 | Simms et al. | 362/32 |
| 5,504,660 | 4/1996 | Heirdorn | 340/815.45 |

*Primary Examiner*—Thomas Mullen, Jr.
*Assistant Examiner*—Daniel J. Wu
*Attorney, Agent, or Firm*—Wenderoth, Lind & Ponack, L.L.P.

[57] ABSTRACT

A display device of electronic equipment comprises a display portion attached to a movable unit having a light incident surface through which light enters and a tip end surface for emitting light which enters through the light incident surface. Light emitting elements (and a prism) are mounted on a body unit for emitting light toward the rear end surface of the display portion in a state where the movable unit is mounted on the body unit. The tip end surface of the display portion is exposed on the surface of the movable unit, whereby the tip end surface is lighted when the emitting elements or the prism emits light toward the rear end surface of the display portion, thereby displaying a state of the electronic equipment.

7 Claims, 7 Drawing Sheets

ELECTRONIC EQUIPMENT

BACKGROUND OF THE INVENTION

1. Field of the Invention

The present invention relates to electronic equipment displaying a state thereof with a display device.

2. Description of the Related Art

There has been, for example, a bankbook/slip printer as one type of electronic equipment. The bankbook/slip printer is installed in a financial institution, particularly in a banking institution, and it comprises a body unit including a printing portion for printing information on a bankbook or a slip and a movable unit having an inserting passage for leading the bankbook or slip into the printing portion. The movable unit is attached to the body unit by a hinge, etc. so as to be turned with respect to the body unit, and includes a display device for displaying a state of the electronic equipment such as "power is ON or OFF" or "alarm (trouble)". For example, if a jam of the bankbook is indicated on the display device, an operator turns the movable unit to permit it to be in an open state so as to remove the jammed bankbook.

The display device comprises a display indicator provided on the front surface of the movable unit, light emitting elements provided inside the movable unit at positions confronting the display indicator, and an interchange board on which the light emitting elements are mounted. The display indicator is permitted to be in a lighting state while light emitted by the light emitting elements passes through the display indicator so as to display a state of the bankbook/slip printer. Signal lines are connected between the body unit and the interchange board so as to transmit signals for emitting light outputted from the body unit to the light emitting elements.

In the conventional bankbook/slip printer, the signal lines connected to the interchange board are apt to be clamped between the body unit, and the movable unit when the movable unit which is in an open state with respect to the body unit, is turned so as to be returned to an original state (closed state). Therefore the signal lines are fixed to the movable unit so as to be broken or disconnected by being clamped. However, as the signal lines are fixed to the movable unit, there occurs a problem in that the same portion of the signal lines is always twisted (deformed) so that the signal lines are gradually damaged at the deformed portion, leading to breakage (breakage due to fatigue), i.e. there occurs a problem of breakage of the signal lines. Since the light emitting signals are not transmitted to the interchange board when the signal lines are broken, there occurs another problem in that the display indicator is not in a lighting state, although the power is turned on, while the display indicator is not in a lighting state even if the bankbook/slip printer has trouble.

A plurality of the signal lines are provided if the bankbook/slip printer has a plurality of display devices, and in that case the signal lines are separated from one another. When the display device is assembled, the signal lines are bundled at a binding portion thereof and then the signal lines are fixed to the movable unit to prevent them from being separated from one another. Therefore, these operations cause a low efficiency of the assembly of the display device.

SUMMARY OF THE INVENTION

It is a piece of object of the invention to provide an electronic equipment capable of displaying a state of the equipment on a display device without using signal lines.

It is another object of the invention to provide a piece of electronic equipment capable of preventing a problem of breakage of signal lines by displaying a state of the equipment on a display device without using signal lines.

It is still another object of the invention to provide a piece of electronic equipment capable of dispensing with binding parts for bundling signal lines, thereby enhancing the efficiency of the assembly of the display device by displaying a state of the equipment on a display device without using signal lines.

It is still another object to provide electronic equipment capable of displaying colored light when displaying a state of the equipment on a display device.

To achieve the above objects of the invention, a piece of electronic equipment comprises a body unit, a movable unit detachably attached to the body unit, and a display device for displaying a state of the electronic equipment. The display device comprises a display portion attached to the movable unit and having a rear end surface through which light enters and a tip end surface exposed on a surface of the movable unit and emitting light which enters through the rear end surface. An emitting means is provided in the body unit for emitting light toward the rear end surface of the display portion in a state where the movable unit is mounted on the body unit.

According to the invention having the structure set forth above, when light is emitted by the emitting means toward the rear end surface of the display portion, the light is emitted from the tip end surface. Accordingly, the tip end surface is permitted to be in a lighting state so that the state of the electronic equipment is displayed without using the signal lines.

DETAILED DESCRIPTION OF THE PREFERRED EMBODIMENT

A piece of electronic equipment according to a preferred embodiment of the invention will be now described with reference to FIGS. 1 to 5. Constitutional elements commonly appearing in FIGS. 1 to 5 are denoted by the same reference numerals.

Figure 1:
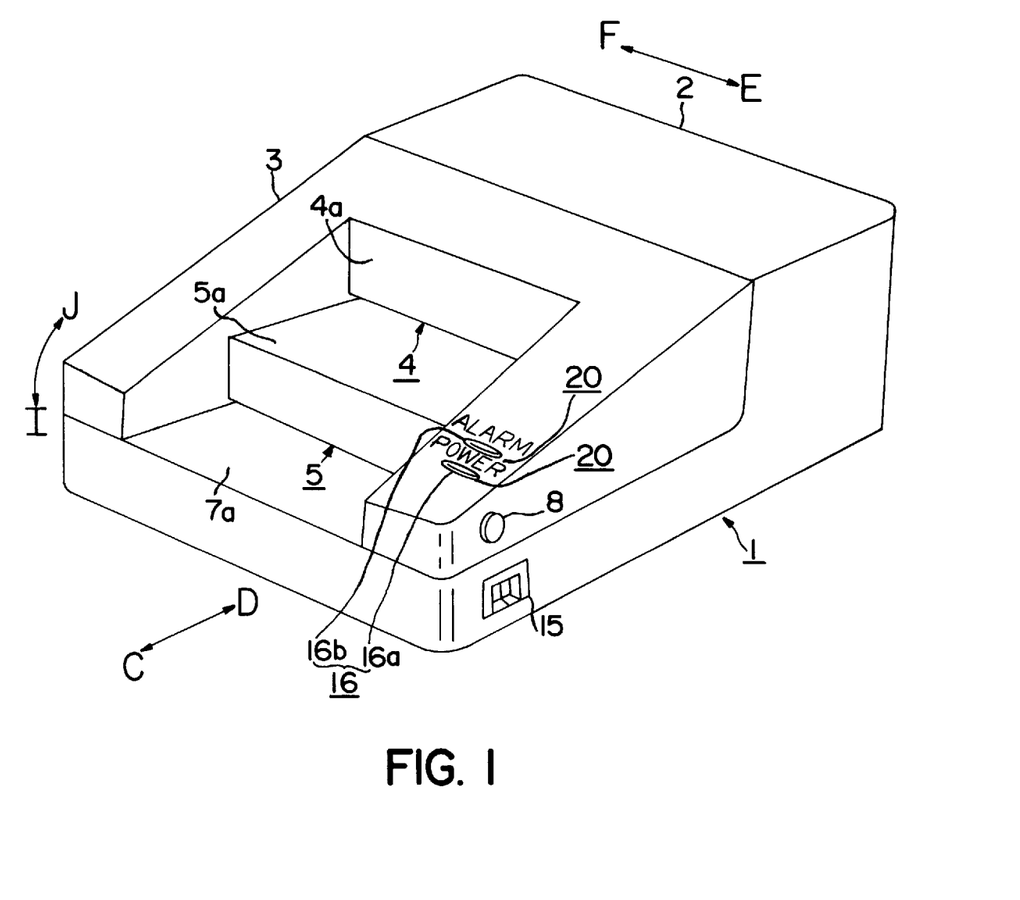
FIG. 1 is a view showing an external appearance of a bankbook/slip printer according to a preferred embodiment of the invention.

A bankbook/slip printer 1 (hereinafter referred to as a printer 1) shown in FIGS. 1 to 3 comprises a body unit 2 and an inserter unit 3 which is detachably attached to the body unit 2. The inserter unit 3 as a movable unit includes an inserting port 4 for inserting or discharging a slip, not shown, an inserting port 5 for inserting or discharging a bankbook, a bond or the like, a feed roller 6a, a pressure roller 6b, a blade 7, and display portions 20 (described in detail later) comprising prisms. The inserting port 4 comprises inserting guides 4a and 5a, and the inserting port 5 comprises the inserting guide 5a and an inserting guide 7a of the body unit 2. The feed rollers 6a are adapted to turn upon reception of a torque or a driving force from a driving source, not shown, and the feed rollers 6b are brought into contact with the confronting feed rollers 6a when a solenoid, not shown, is energized. The blade 7 is turned in the direction denoted by the arrows A and B when a solenoid is energized or deenergized so as to switch a medium traveling direction.

Tip end surfaces 16 (16a, 16b) of the display portions 20 are surfaces through which light is emitted and they are exposed on the upper surface of the inserter unit 3. When light is emitted through the tip end surfaces 16, the tip end surfaces 16 are permitted to be in a lighting state. According to the preferred embodiment, when the tip end surface 16a is in a lighting state, it represents "power is ON" while when the tip end surface 16b is in a lighting state, it represents "alarm" such as jam of the bankbook or a slip.

Figure 4:
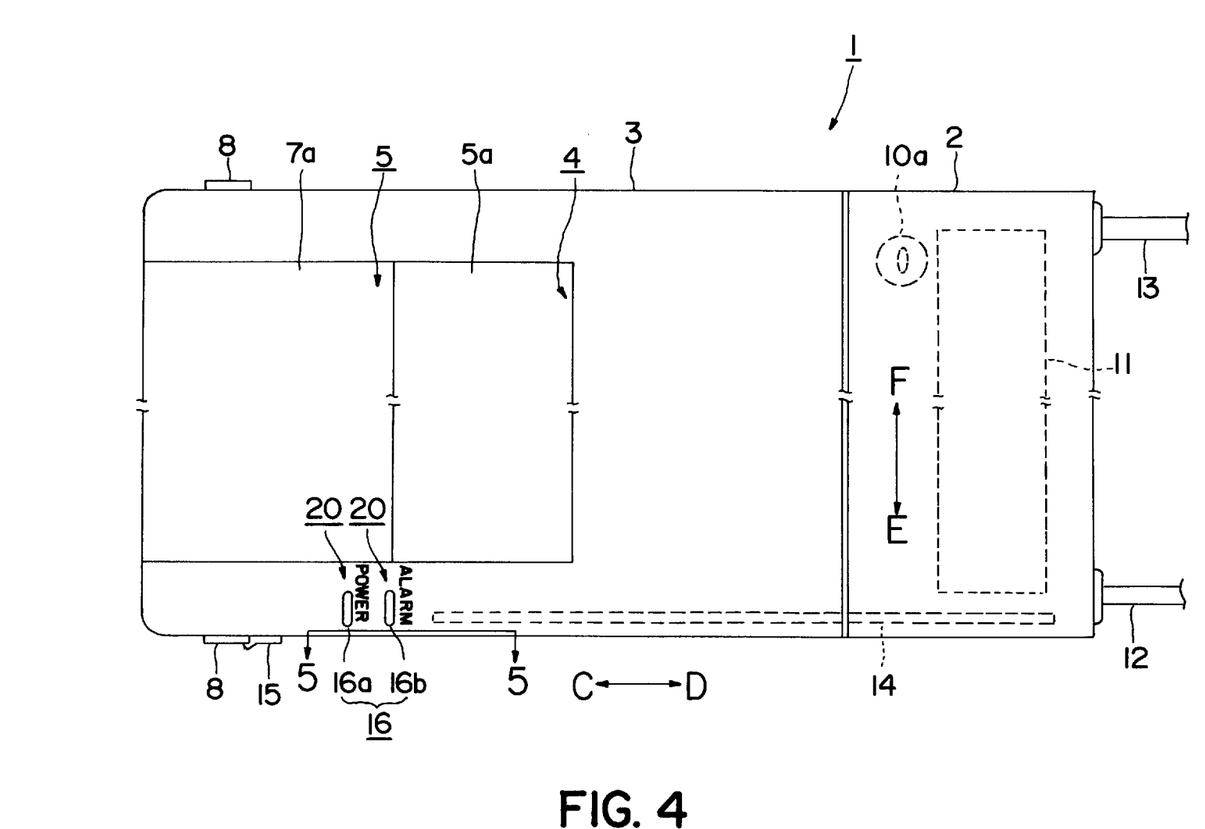
FIG. 4 is a plan view of the bankbook/slip printer of FIG. 3.

Display characters of "POWER" and "ALARM", which represent the state of the printer 1 when the tip end surfaces 16a and 16b of the inserter unit 3 are in lighting states, are printed at a portion adjacent to each of the tip end surfaces 16a and 16b of the inserter unit 3 as shown in FIG. 4.

There are provided lock releasing buttons 8 at both side surfaces of the inserter unit 3. When each lock releasing button 8 is pushed, a lock mechanism, not shown, is released so that the inserter unit 3 is movable with respect to the body unit 2 in a direction of the arrow C (detaching direction), and hence the inserter unit 3 can be removed from the body unit 2. When the inserter unit 3 is mounted on the body unit 2, the inserter unit 3 is positioned in a direction crossing at right angles (lateral direction) with the directions of the arrows C and D by a positioning member, not shown. Thereafter, when the inserter unit 3 is moved in the direction of the arrow D (mounting direction), the inserter unit 3 is automatically locked to the body unit 2 by the lock mechanism so that the mounting of the inserter unit 3 on the body unit 2 is completed.

The detail of the body unit 2 will be now described with reference to FIGS. 1, 3 and 4.

The body unit 2 comprises a magnetic recording portion 9 provided near the inserting port 5, a printing portion 10 which moves in the directions of the arrows E and F to print information on the slip or the bankbook, the feed rollers 6a and 6c, pressure rollers 6d which are brought into contact with the feed rollers 6a and 6c, a power source 11 of the entire printer 1, an AC power source cord 12, a connecting cord 13 connected to other personal computers, etc. for transmitting and receiving signals, and a control board 14 for controlling the entire printer 1. The magnetic recording portion 9 has a magnetic head 9a for writing data on a magnetic stripe provided on the bankbook and reading data from the magnetic stripe. The printing portion 10 includes a print head 10a and a platen 10b. The body unit 2 has a switch 15 at the side wall thereof for turning on or off the DC power source for supplying power to the printer 1 through the AC power source cord 12.

A connector 17 is provided in the printer 1. The inserter unit 3 is electrically connected to the body unit 2 by the connector 17 when the inserter unit 3 is moved with respect to the body unit 2 in the direction of the arrow D to be mounted on the body unit 2.

Figure 5:
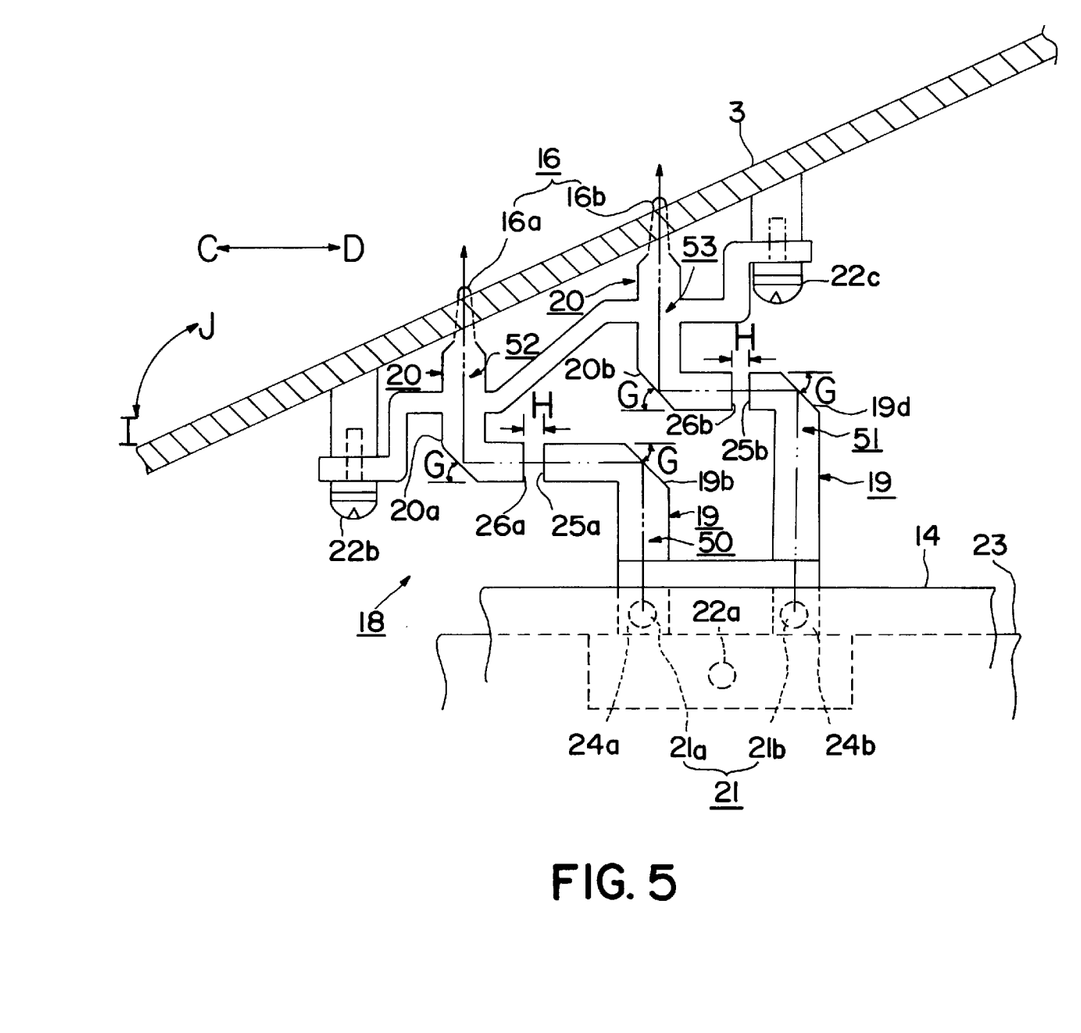
FIG. 5 is a cross sectional view explaining the display device of FIG. 4 taken along line 5—5 in FIG. 4.

The display device for permitting the tip end surfaces 16 to be in a lighting state will be now described with further reference to FIGS. 2 to 5. Two-dotted and chain lines shown in FIG. 5 represents light passages.

Figure 2:
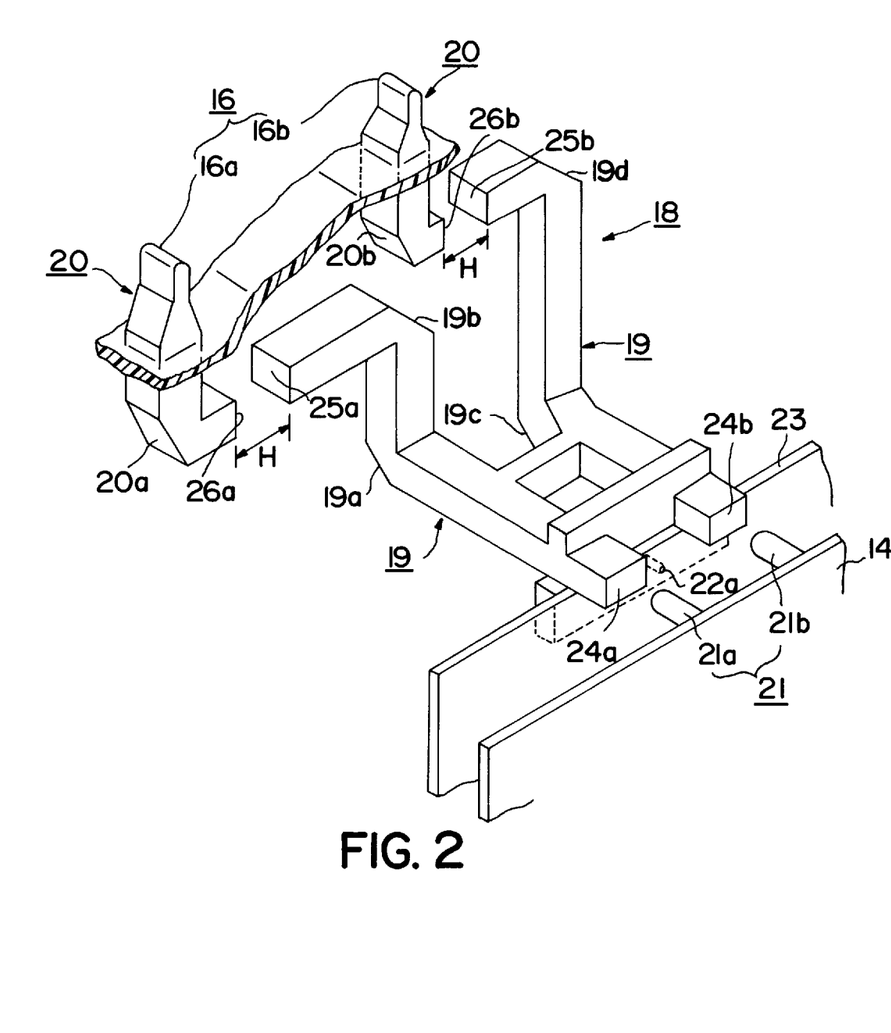
FIG. 2 is a schematic perspective view showing a display device of the preferred embodiment.

The display device 18 shown in FIGS. 2 and 5 includes two light emitting elements 21 (21a and 21b) provided on the control board 14, prisms 19 serving as light transmission members provided in the body unit 2, and the display portions 20 provided in the inserter unit 3. The light emitting elements 21 and the prisms 19 form light emitting portions for emitting light toward the display portions 20. Light emitted from the light emitting elements 21 passes through the prisms 19 and the display portions 20, then reaches the tip end surfaces 16. The prisms 19 are fixed to a cover 23 provided inside the body unit 2 by way of a screw 22a and the display portions 20 are fixed to the inserter unit 3 by way of screws 22b and 22c.

Light emitting surfaces 25a and 25b are formed at one end of each of the prisms 19 confronting the display portions 20, and light incident surfaces 24a and 24b are respectively formed at the other end of each of the prisms 19 confronting the light emitting elements 21 for receiving light emitted from the light emitting element 21a and 21b. Light entering through the light incident surface 24a is emitted from the light emitting surface 25a while light entering through the light incident surface 24b is emitted from the light emitting surface 25b.

The prisms 19 are bent at a midway point thereof, and light entering through the light incident surfaces 24a and 24b is respectively reflected by bent portions 19a, 19b, 19c and 19d (reflecting surfaces 19a, 19b, 19c and 19d) and reaches the light emitting surfaces 25a and 25b.

That is, the prisms 19 form a light passage 50 connecting the light incident surface 24a, the bent portions 19a and 19b and the light emitting surface 25a, and a light passage 51 connecting the light incident surface 24b, the bent portions 19c and 19d and light emitting surface 25b. The two prisms 19 forming both light passages 50 and 51 are integrally formed by transparent resin.

Provided at the rear ends of the display portions 20 are a light incident surface 26a which confronts the light emitting surface 25a for receiving light emitted from the light emitting surface 25a and a light incident surface 26b which confronts the light emitting surface 25b for receiving light emitted from the light emitting surface 25b.

The display portions 20 are bent at a midway point thereof, and light entering through light incident surfaces 26a and 26b is respectively reflected on bent portions 20a and 20b (reflecting surfaces 20a and 20b), and reach the tapered tip end surfaces 16a and 16b.

That is, the display portions 20 form a light passage 52 connecting the light incident surface 26a, the reflecting surface 20a and the tip end surface 16a, and a light passage 53 connecting the light incident surface 26b, the reflecting surface 20b and the tip end surface 16b. The two display portions 20 forming both light passages 52 and 53 are integrally formed by transparent resin.

Each angle G (see FIG. 5) of the reflecting surfaces 19a to 19d, 20a and 20b is 45 degrees with respect to entering light. Accordingly, when light entered the light incident surfaces 24a and 24b strikes against the reflecting surfaces 19a to 19d, it is reflected at right angles as shown in FIG. 5, and then it is guided to the light emitting surfaces 25a and 25b. Further, light that has entered the light incident surfaces 26a and 26b from the light emitting surfaces 25a and 25b strikes against the bent portions 20a and 20b, is reflected at right angles, and is guided into the tip end surfaces 16a and 16b.

Suppose that light emitted from the light emitting element 21a is green and light emitted from the light emitting element 21b is red in the preferred embodiment.

The light emitting surfaces 25a and 25b and light incident surfaces 26a and 26b respectively have square shapes having sizes of 5×5 mm, and each distance H between light emitting surfaces 25a and 25b and light incident surfaces 26a and 26b are respectively set to 3 mm.

Because the distance H is set to 3 mm, when the inserter unit 3 is moved in the direction of the arrow D to be mounted on the body unit 2, the light incident surfaces 26a and 26b are not liable to strike against the light emitting surfaces 25a and 25b.

The display operation of the printer 1 of the preferred embodiment will now be described with reference to FIGS. 1 to 5.

When the switch 15 of the printer 1 is turned on, the control board 14 permits the light emitting element 21a to emit light. Light emitted from the light emitting element 21a enters the light incident surface 24a, is reflected on the reflecting surfaces 19a and 19b and, finally enters the light incident surface 26a through the light emitting surface 25a. Light being entered the light incident surface 26a is reflected on the reflecting surface 20a and is emitted from the tip end surface 16a. Since the light emitting element 21a emits green light, the tip end surface 16a is in a lighting state with green.

Accordingly, the operator can confirm that the power is turned on. Thereafter, when the bankbook or the slip is inserted into the inserting port 4 or the inserting port 5, the bankbook or the slip is clamped by the feed roller 6a and the pressure roller 6b or 6d and taken into the inserter unit 3.

Figure 3:
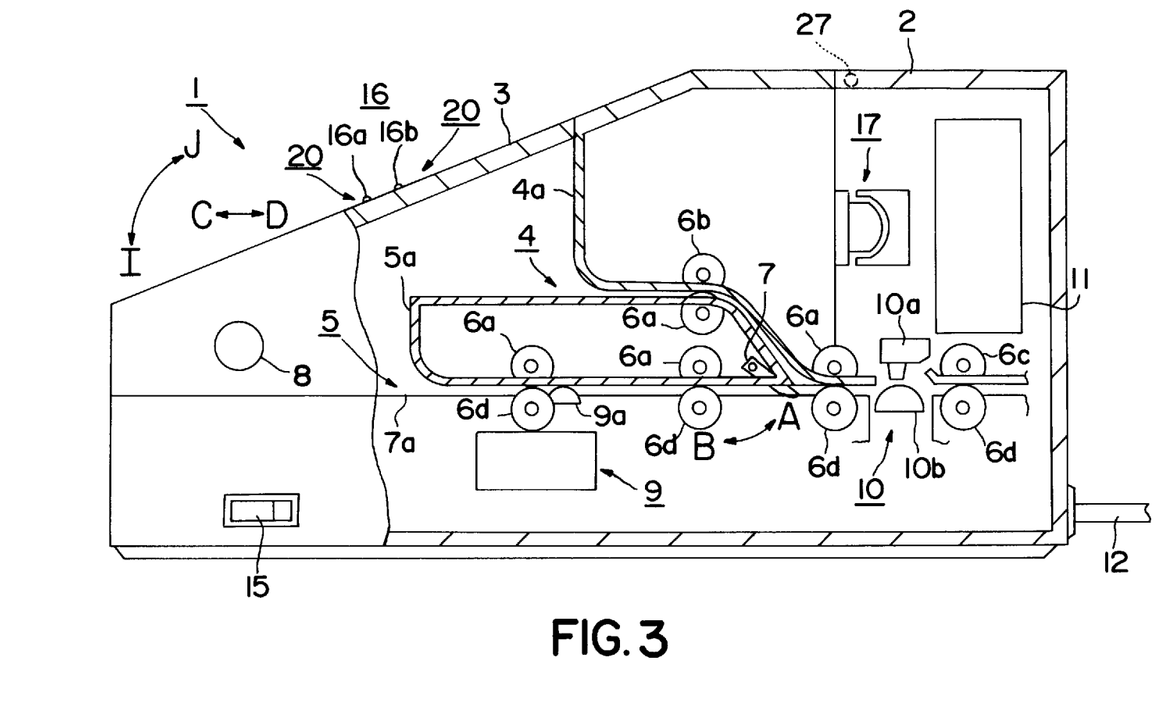
FIG. 3 is a view showing a schematic arrangement of the bankbook/slip printer of the preferred embodiment.

When the slip is inserted, the blade 7 is turned to a position as shown in FIG. 3, and it is fed by the feed roller 6a and the pressure rollers 6b and 6d and guided to the printing portion 10. When the bankbook is inserted, the blade 7 is turned in the direction of the arrow A, and it is fed by the feed rollers 6a and the pressure rollers 6d, and is guided to the printing portion 10 through the magnetic recording portion 9.

When the slip or the bankbook which is taken into the inserter unit 3 is jammed between the inserter unit 3 and the printing portion 10, the jam is detected by a sensor, etc., not shown, so that the sensor issues a detected signal, which is supplied to the control board 14. The control board 14 permits the light emitting element 21b to emit light upon reception of the detecting signal. Light emitted from the light emitting element 21b enters the light incident surface 24b, is reflected on the reflecting surfaces 19c and 19d, and enters the light incident surface 26b through the light emitting surface 25b. Light having entered the light incident surface 26b is reflected on the reflecting surface 20b and is emitted from the tip end surface 16b. Since the light emitting element 21b emits red light, the tip end surface 16b is in a lighting state with red.

Thus, the operator knows the occurrence of jam of the bankbook or slip.

Thereafter, pushing the lock releasing button 8, the operator moves the inserter unit 3 in the direction of the arrow C so that the inserter unit 3 is removed from the body unit 2, and then the jammed bankbook or the slip is removed. After the jammed bankbook or the slip is removed, the inserter unit 3 is mounted on the body unit 2 and is moved in the direction of the arrow D until the former is locked to the latter.

In the preferred embodiment, since two display portions 20 and two prisms 19 are respectively integrally formed, it is not necessary to increase the number of prisms or brackets or screws, etc. for fixing the prisms, whereby the number of parts are not influenced by the number of the light emitting elements.

In the preferred embodiment, if the areas of the light emitting surfaces 25a and 25b of the prisms 19 and those of the light incident surfaces 26a and 26b of the display portions 20 are increased and each distance H between the light emitting surfaces 25a and 25b and the light incident surfaces 26a and 26b is reduced, it is possible to restrain the transmission loss of light between the light emitting surfaces 25a and 25b and the light incident surfaces 26a and 26b. That is, when each distance H is decreased, most of light emitted from the light emitting surfaces 25a and 25b enters the light incident surfaces 26a and 26b, thereby simplifying the operation for adjusting an attaching position where the prisms 19 and the display portions 20 are attached to the printer 1.

In the preferred embodiment, although the light emitting surfaces 25a and 25b of the prisms 19 and the light incident surfaces 26a and 26b of the display portions 20 have respectively square shapes of 5×5 mm, and each distance H between the light emitting surfaces 25a and 25b and the light incident surfaces 26a and 26b are set to 3 mm, the shapes and sizes of the light emitting surfaces 25a and 25b and the distance H may not be limited to those in the preferred embodiment.

It is needless to say that the number of the reflecting surfaces formed on the display portions and the prisms is variable depending on the position and direction of the control board 14 to be installed and the number of the light emitting elements 21 to be attached, and the inclined angle of the reflecting surfaces is not limited to 45 degrees.

In the preferred embodiment, although the inserter unit 3 is provided to be movable in the directions of the arrows C and D, it may be attached to the body unit 2 to be turned about a fulcrum 27 in directions of the arrows I and J shown in FIG. 3. In this case, it is necessary that the distance H is set in a manner that the light incident surfaces 26a and 26b do not strike against the light emitting surfaces 25a and 25b of the prisms 19 when the inserter unit 3 is turned.

In the preferred embodiment, although light emitted from the light emitting elements 21 is transmitted to the display portions 20 by way of the prisms 19, the prisms 19 may be omitted when the light emitting elements 21 or the control board 14 is attached at a position where light emitted from the light emitting elements 21 is directly transmitted to the light incident surfaces 26a and 26b. In this case, the number of components may be reduced compared with that in the preferred embodiment.

In the preferred embodiment, although the light emitting elements 21 are employed as the light source, the light source is not limited to the light emitting elements 21, and other elements which emit red and green light to the prisms 19 or the display portions 20 may be employed.

In the preferred embodiment, although light emitted from the light emitting elements 21 is transmitted to the display portions 20 through the prisms 19, such light may be transmitted through optical fibers instead of the prisms.

In the preferred embodiment, the prisms 19 and the display portions 20 are structured in the manner that they respectively have two light incident surfaces (24a, 24b; 26a, 26b) and two light emitting surfaces (25a, 25b; 16a, 16b), and light emitted from the two light emitting elements is individually transmitted by integrated prisms 19 and the display portions 20 and displayed on the integrated display portions 20. However, the shapes of the prisms 19 and display portions 20 are not limited to those in the preferred embodiment but may be, for example, those as illustrated in FIG. 6.

Figure 6:
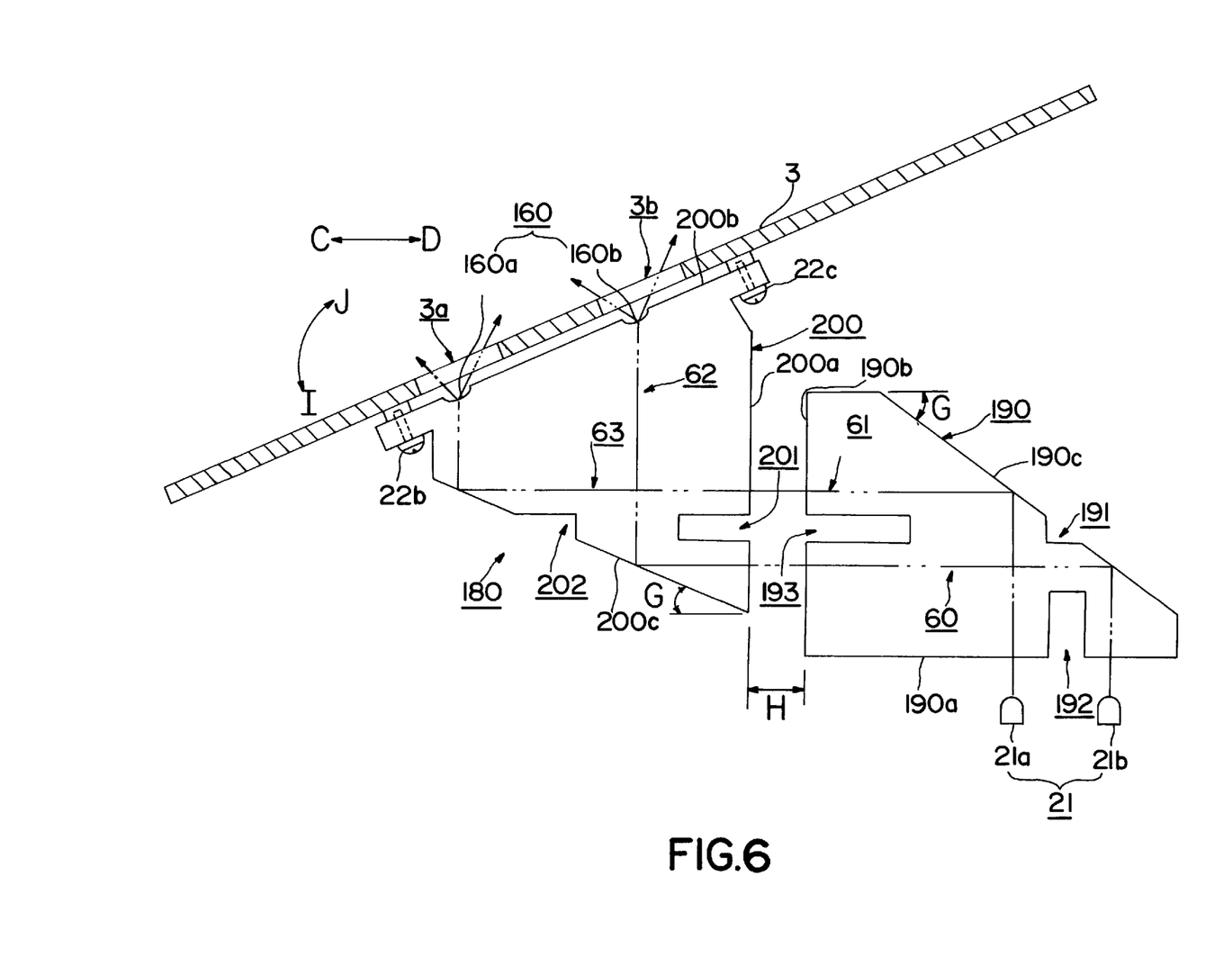
FIG. 6 is a cross sectional view of a modified display device corresponding to that of FIG. 5.

FIG. 6 shows a display device 180 according to a modification of the preferred embodiment.

A prism 190 has a substantially triangular shape in its cross section and includes a bottom surface 190a serving as a light incident surface, a side surface 190b serving as a light emitting surface, an inclined surface 190c serving as a light reflecting surface.

The prism 190 has cut away portions 191, 192 and 193.

Light emitted from the light emitting elements 21a and 21b enters through the bottom surface 190a with the cut away portion 192 interposed, is reflected on the light reflecting surface 190c, and is emitted from the side surface 190b. At this time, two emitted lights individually form light passages 60 and 61 by the cut away portions 191 to 193 and they are emitted from the light emitting surface 190b.

A display portion 200 has a substantially triangular shape in its cross section and includes a side surface 200a serving as a light incident surface, an upper inclined surface 200b serving as a light emitting surface and a lower inclined surface 200c serving as a light reflecting surface. The display portion 200 has cut away portions 201 and 202, and recessed surfaces 160 (160a, 160b). The recessed surfaces 160a and 160b are formed on the tip end surface of the display portion 200.

Two lights emitted from the prism 190 enter through the light incident surface 200a with the cut away portion 201. They are reflected on the light reflecting surface 200c, and then they are emitted from the recessed surfaces 160. At this time, two lights individually form light passages 62 and 63 by the cut away portions 201 and 202 and they are emitted from the recessed surfaces 160.

Holes 3a and 3b are defined in the inserter unit 3 at portions confronting the recessed surfaces 160a and 160b. Light radially emitted from the recessed surfaces 160a and 160b are respectively emitted from the confronting holes 3a and 3b so as to inform the operator of the presence of the light. When the display portion 200 is attached to the inserter unit 3 to be close to the holes 3a and 3b, most of the light radially emitted from the recessed surfaces 160 is emitted from the holes 3a and 3b.

In the display device 180 of the modified example, the prism 190 and the display portion 200 are easily integrated. The modified example has the same effect as the preferred embodiment.

Figure 7:
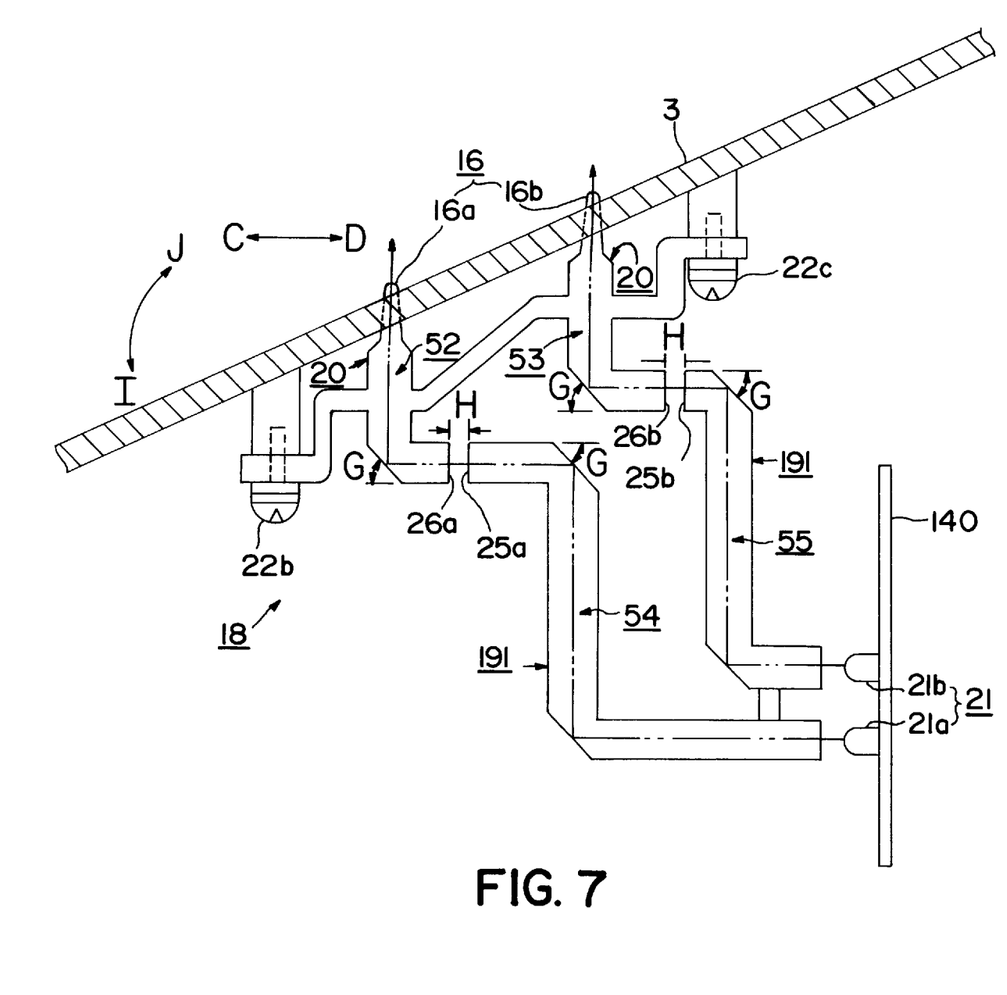
FIG. 7 is a cross sectional view explaining another modified display device corresponding to that of FIG. 5.

FIG. 7 is a view showing another modified display device, wherein the display device is different from that of the preferred embodiment shown in FIGS. 1 to 5 and that of the modified example shown in FIG. 6.

In FIG. 7, the light emitting elements 21 are attached to a position that is different from that shown in FIGS. 1 to 5 and that shown in FIG. 6. The shape of prisms 191 is different from that of the prisms 19 of the preferred embodiment (see FIGS. 2 and 5) depending on the attaching position of the light emitting elements, and the other end portions of the prisms 191 confronting the light emitting elements 21 are bent along the direction denoted by the arrows C and D. The prisms 191 have two light passages 54 and 55 through which light emitted from the light emitting elements 21 is transmitted to the display portions 20. Other structures of the display device of this example are the same as those of the preferred embodiment.

As is evident from the above explanation, even if the attaching position of the light emitting elements 21 is changed, it is possible to transmit light emitted from the light emitting elements 21 to the tip end surfaces 16 of the display portions 20 through the prisms 191 by changing the shape of the prisms 191, thereby obtaining the same effect as the preferred embodiment.

The display device 18, 180 is provided on the bankbook/slip printer 1 according to the preferred embodiment and its modified example. However, the display device 18, 180 is not always provided on the bankbook/slip printer, but may be provided on various electronic equipment which needs to have a display of the state of the equipment.

What is claimed is:

1. Electronic equipment, comprising:

a body unit;

a movable unit detachably attached to said body unit, said movable unit having a surface; and a display device comprising:

a display portion attached to said movable unit having a rear end surface for receiving light and a tip end surface exposed at said surface of said movable unit for emitting light that has entered through said rear end surface, a light source provided at a position remote from said display portion, and a light transmission member having one end surface confronting said rear end surface of said display portion when said movable unit is attached to said body unit and another end surface confronting said light source such that when said movable unit is attached to said body unit, light emitted from said light source enters through said another end surface confronting said light source and is emitted from said one end surface;

wherein said rear end surface of said display portion and said one end surface of said light transmission member extend vertically so as to be parallel to the direction of gravity such that, when said movable unit is attached to said body unit, said rear end surface of said display portion and said one surface of said light transmission member are opposed; and wherein said display portion and said light transmission member are separate and distinct from each other.

2. The electronic equipment of claim 1, wherein:

said display portion is a first display portion, and said electronic equipment further comprises a second display portion attached to said movable unit having a rear end surface for receiving light and a tip end surface exposed at said surface of said movable unit for emitting light that has entered through said rear end surface;

said light source is a first light source and said electronic equipment further comprises a second light source; and said light transmission member is a first light transmission member and said electronic equipment further comprises a second light transmission member having one end surface confronting said rear end surface of said second display portion when said movable unit is attached to said body unit and another end surface confronting said second light source such that when said movable unit is attached to said body unit, light emitted from said second light source enters through said other end surface confronting said second light source and is emitted from said one end surface.

3. The electronic equipment of claim 2, wherein said first and second light sources emit different color light.

4. The electronic equipment of claim 1, wherein:

said movable unit and said body unit are configured such that when said movable unit is attached to said body unit said movable unit is moved to said body unit in a mounting direction and when said movable unit is detached from said body unit said movable unit is moved from said body unit in a detachment direction;

said rear end surface of said display portion faces in said mounting direction; and said one end surface of said light transmission member faces in said detachment direction of said movable unit.

5. The electronic equipment of claim 1, wherein said rear end surface of said display portion is spaced from said one end surface of said light transmission member.

6. The electronic equipment of claim 1, and further comprising a means for releasing a locking mechanism between said movable unit and said body unit such that said movable unit can be detached from said body unit.

7. The electronic equipment of claim 1, wherein said light transmission member is mounted in said body unit.

* * * * *